United States Patent [19]
Trapani

[11] 4,201,450
[45] May 6, 1980

[54] RIGID ELECTRO-OPTIC DEVICE USING A TRANSPARENT FERROELECTRIC CERAMIC ELEMENT

[75] Inventor: Giorgio B. Trapani, Cambridge, Mass.

[73] Assignee: Polaroid Corporation, Cambridge, Mass.

[21] Appl. No.: 893,195

[22] Filed: Apr. 3, 1978

[51] Int. Cl.$^2$ .................. G02F 1/05; G02C 7/12
[52] U.S. Cl. ................................ 350/150; 350/49
[58] Field of Search ..................... 350/150; 351/49

[56] References Cited
U.S. PATENT DOCUMENTS

| | | | |
|---|---|---|---|
| 2,632,725 | 3/1953 | Marks et al. | 154/128 |
| 2,811,892 | 11/1957 | West | 350/150 |
| 3,069,973 | 12/1962 | Ames | 350/150 |
| 3,137,784 | 6/1964 | Käsemann | 219/147 |
| 3,245,315 | 4/1966 | Marks et al. | 351/49 |
| 3,467,463 | 9/1969 | Borrelli et al. | 350/150 |
| 3,506,333 | 4/1970 | Land | 350/150 |
| 3,512,864 | 5/1970 | Haertling et al. | 350/150 |
| 3,531,182 | 9/1970 | Land et al. | 350/150 |
| 3,639,771 | 2/1972 | Borrelli et al. | 350/150 |
| 3,666,666 | 5/1972 | Haertling | 350/150 |
| 3,713,723 | 1/1973 | Buchan | 350/150 |
| 3,740,118 | 6/1973 | Land et al. | 350/150 |
| 3,741,627 | 6/1973 | Haertling et al. | 350/150 |
| 3,744,875 | 7/1973 | Haertling et al. | 350/150 |
| 3,997,690 | 12/1976 | Chen | 350/150 |
| 4,057,324 | 11/1977 | Kawashima | 350/150 |

FOREIGN PATENT DOCUMENTS 690467   4/1953   United Kingdom .................. 350/150

OTHER PUBLICATIONS

Sorenson et al., "Preparative Methods of Polymer Chemistry", Chapt. 7, "Synthetic Resins", Interscience Publishers Inc., N.Y., 1961, pp. 285–289.
Shelly, J. E., "Unsaturated Polyester", Modern Plastics Encyclopedia, 1976–1977, pp. 62–63.
Czarnomski, T. V., "Unsaturated Polyester", Modern Plastics Encyclopedia, 1977–1978, p. 64.
Cutchen et al., "Electrooptic Devices Utilizing Quadratic Plzt Ceramic Elements", paper presented at the 1973 Western Electronic Show & Convention (Wescon) Session 30, Sep. 13, 1973.
Haertling, G. H., "Hot Pressed Ferroelectric Lead Zirconate Titanate Ceramics for Electro-Optical Application", Amer. Ceramic Soc. Bull., Jun. 1970, pp. 564–567.
Haertling, G. H., "Improved Hot-Pressed Electrooptic Ceramics in the (PB,LA)(Zr,Ti)O$_3$ System" Jr. Amer. Ceramic Soc. Jun. 1971, pp. 303–309.

*Primary Examiner*—John K. Corbin
*Assistant Examiner*—Wm. H. Punter
*Attorney, Agent, or Firm*—Louis G. Xiarhos

[57] ABSTRACT

A rigidly bonded electro-optic phase retardation device comprising a transparent, electrically induced ferroelectric ceramic element bonded with a rigid adhesive in sandwich-like configuration between transparent sheet elements, such as glass, or polarizer elements is described. The electro-optic phase retardation device, provided with means for applying an electric field across at least a portion of the induced ferroelectric ceramic element, can be utilized as a birefringent optical device for controllable modulation of polarized light passing through the device. The device is bonded with an adhesive material, such as a cross-linked unsaturated polyester, effective to provide a rigid boundary between the ceramic material and the sheet elements thereof and exhibits rapid optical response speed in the switching from a field-induced birefringent mode to an isotropic zero-field condition. The device is thus suited to application in welding plates, glasses, goggles, helmets and similar devices for controlling the transmission of light radiations to the wearer's eyes, particularly in the prevention of flashblindness.

29 Claims, 8 Drawing Figures

RIGID ELECTRO-OPTIC DEVICE USING A TRANSPARENT FERROELECTRIC CERAMIC ELEMENT

BACKGROUND OF THE INVENTION

This invention relates to an electro-optic phase retardation device. More particularly, it relates to such a device in a rigidly bonded sandwich-like configuration and exhibiting high optical response speed in the switching of a transparent ferroelectric ceramic element between birefringent and substantially isotropic states.

Electro-optic systems and devices are well known and are described, for example, in U.S. Pat. Nos. 3,069,973 (issued Dec. 25, 1962 to I. Ames); 3,467,463 (issued Sept. 16, 1969 to N. F. Borrelli et al); 3,512,864 (issued May 19, 1970 to G. H. Haertling et al); 3,713,723 (issued Jan. 30, 1973 to W. R. Buchan); and 4,057,324 (issued Nov. 8, 1977 to Kawashima et al). Electro-optic devices utilize variations in an electric field applied across a transparent active element to produce variations in the refractive index of the element in order to modulate the intensity of polarized light passing through the device. Such devices will normally comprise a controllable birefringent element located between two polarizers having their planes of polarization at right angles to one another. The light input passes through the first polarizer and enters the element as plane-polarized light. In the absence of an electrical field across the active element, the plane-polarized light passes through the element without rotation and is totally absorbed by the second polarizer. However, when an electrical field is applied to the element, the element becomes birefringent, and the light emerges from the element as elliptically or circularly polarized light, part of which passes through the second polarizer, or analyzer.

Electro-optic ceramic materials of the quaternary $(Pb_{1-x}La_x)(Zr_yTi_z)_{1-x/4}O_3$, system, commonly known as PLZT, have been intensively investigated in recent years. These ceramic materials are polycrystalline lanthanum-modified lead zirconate-titanate materials which exhibit uniaxial birefringence on a macroscopic scale when polarized by an external field and their light transmission characteristics are similar to those of uniaxial crystals. The high optical transmission properties of the PLZT materials and the availability of such materials having a range of desirable compositional and electro-optic properties have led to utilization of the PLZT ceramics in a number of electro-optic applications. PLZT materials, their properties, methods of preparation and applications thereof can be found, for example, in U.S. Pat. No. 3,666,666 (issued May 30, 1972 to G. H. Haertling) and in the publications "Hot-Pressed Ferroelectric Lead Zirconate Titanate Ceramics for Electro-Optical Applications" (G. H. Haertling, The American Ceramic Society Bulletin, Vol. 49 No. 6, June 7, 1970, pp. 564–567) and "Improved Hot-Pressed Electrooptic Ceramics" in the (Pb, La) (Zr, Ti)O₃ System, Journal of the American Ceramic Society, Vol. 54 No. 6, June, 1971, pp. 303–309).

The utilization of PLZT ceramic elements in electro-optic devices of the fast-shutter type has been described by J. T. Cutchen et al, in "Electrooptic Devices Utilizing Quadratic PLZT Ceramic Elements", a paper presented at the 1973 Western Electronic Show and Convention (Wescon), Session 30, on Ferroelectric Ceramic Electro-Optic Devices, Sept. 13, 1973. The employment of PLZT elements in electro-optic devices of such type, particularly in connection with flashblindness protective devices in goggles, glasses, helmets, and the like, has been contemplated. In this connection, the utilization of a PLZT ceramic wafer pressed between two crossed polarizers in a sandwich-like configuration has been proposed. The application of an electric field to the PLZT ceramic element (the "ON" state) renders the ceramic element birefringent, the birefringence being a quadratic dependence on the electric field (known as the Kerr effect). In the field-induced "ON" state, the electro-optic device is light transmissive. At zero field (the "OFF" state), the PLZT wafer exhibits substantially no birefringence, thus, rendering the electro-optic device non-transmissive to light, for example, optical density four to five. It will be appreciated that in an electro-optic device for the prevention of flashblindness, a closure from the relatively high-transmissive mode to the protective high-density mode should be as rapid as possible.

The application of an electric field to a PLZT wafer induces mechanical strains in the ferroelectric element as the result of ferroelectric polarization of grains of the ceramic element. While a rapid discharge of the electric field, as by discharge through a resistance in response to a signal from a photoconductor cell or other light-responsive element, will effect a relaxation of these strains, the return of the ceramic element to optical isotropy is not instantaneous and oscillations in the level of light transmission accompany oscillations in the PLZT ceramic element. The result is that transmission of light decreases with time until the desired protective optical density of the fully-"OFF" state is achieved.

While the mechanical clamping of rigid isotropic elements to a PLZT ceramic wafer will permit sufficient mechanical integrity for an electro-optic device of the fast shutter type, and will enable the device to be rapidly switched from the "ON" state to a protective "OFF" optical density, the mechanical coupling of the elements of such a device is particularly incompatible with the objective of providing an integral and easily handled electro-optic device capable of utilization in such devices as goggles, helmets or the like without misalignment or separation of the elements. In addition, air gaps between mechanically clamped elements give rise to reflection losses. The utilization of an adhesive material to bind the PLZT ceramic element to rigid elements, such as glass, and to provide structural integrity and compactness, is frequently observed to result in deterioration of the switching time or optical response speed (ORS) of the PLZT element.

It is an object of the present invention to provide a rigidly bonded electro-optic device.

It is another object of the present invention to provide a preassembled and rigidly bonded electro-optic device having good mechanical coupling and integrity of the elements thereof and exhibiting rapid optical switching characteristics.

A further object is to provide such a device capable of transmitting light in a field-induced state and rapidly switchable to a protective "OFF" state optical density.

Still another object of the invention is to provide such a device capable of utilization in flashblindness protection devices.

Other objects will become apparent from the description appearing hereinafter.

SUMMARY OF THE INVENTION

These and other objects can be achieved by the present invention which resides in an electro-optic phase retardation device comprising a transparent electrically induced ferroelectric ceramic element provided with means for applying an electric field across at least a portion thereof and bonded with a rigid adhesive in sandwich-like configuration between rigid sheet elements. It has been found that a ferroelectric ceramic material of the PLZT-type can be adhesively bonded to rigid elements, such as glass, polarizing elements, or the like, to provide a compact and integral electro-optic device of the fast-shutter type exhibiting rapid switching characteristics. The employment of adhesive materials capable of providing a rigid coupling of the elements of the electro-optic device will permit rapid optical switching characteristics with minimal deterioration, and in some cases, improvement of the optical response speed of the PLZT element. The utilization of such adhesive materials for the formation of a rigid boundary between the ceramic and other elements of the electro-optic device, thus, permits the construction of a preassembled and rigidly bound integrated structure in an electro-optic device useful in fast-shutter applications.

Various objects, details, constructions, operations, uses, advantages, and modifications of the invention will be apparent from the following description, taken in conjunction with the illustrative drawings of certain operations and embodiments thereof.

THE DRAWINGS

DETAILED DESCRIPTION

Figure 1:
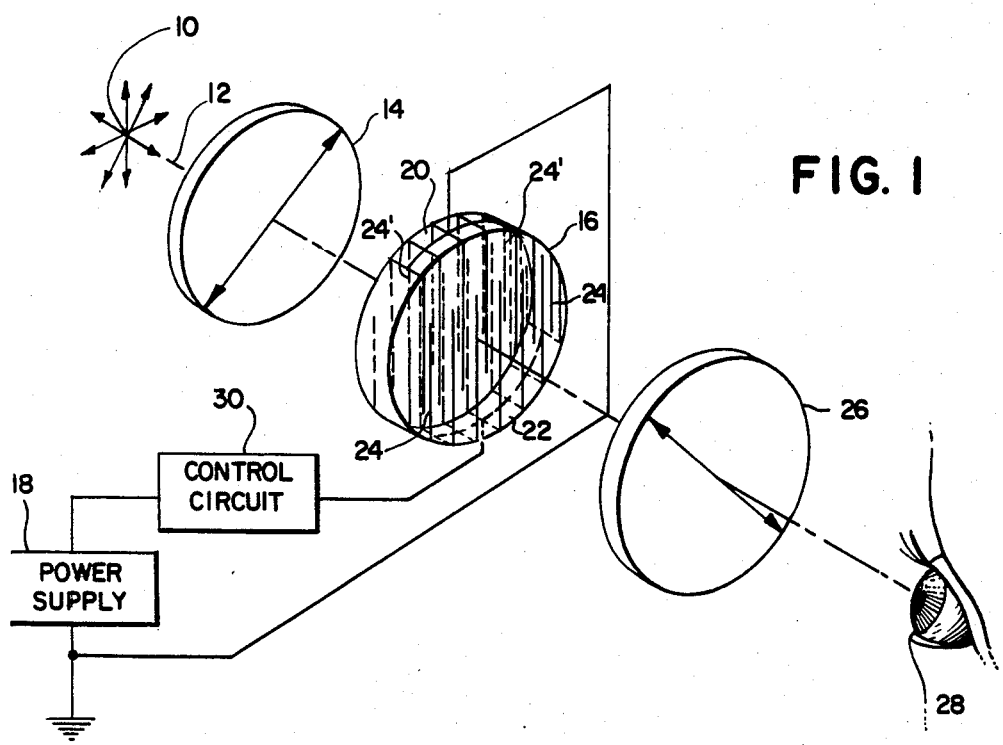
FIG. 1 is a diagramatic perspective of an electro-optic phase retardation system comprising a ferroelectric ceramic plate disposed between crossed polarizer elements in the Kerr-cell configuration.
Figure 2:
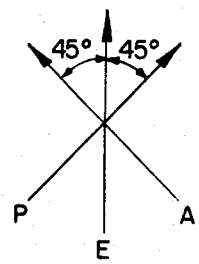
FIG. 2 is a schematic illustration of the relationship between direction of the applied electric field and the planes of polarization of the crossed polarizer elements.

Referring to the drawings, there is shown in FIG. 1, in simplified diagrammatic form with exaggerated dimensions, the operation of an electro-optic device. A source of light 10, typically unpolarized light, is directed along a light transmission path indicated by broken line 12 to a polarizer element 14. Polarizer 14 intercepts the light and polarizes it in a plane. After passing through polarizer 14, the light enters PLZT ceramic element 16. Element 16 is a wafer of PLZT ceramic material which functions, when voltage is applied to the wafer, as a retarder, shifting the phase of the incident plane-polarized light. A variable DC voltage from an appropriate power source or pulse generator 18 is applied, in a plane normal to the direction of propagation of the light across collector bars 20 and 22 connected to a plurality of electrodes 24 and 24' on the surfaces of wafer element 16. The electric field is applied across at least one surface of element 16, and as shown, is applied across both surfaces of element 16 through collector bars 20 and 22 and metallic interdigital electrodes 24, on one surface of plate 16, and 24' on the opposite surface of wafer 16. Analyzer 26 has its plane of polarization perpendicular to that of polarizer 14. Element 16 is rotated at an angle of 45° to the direction of the electric vector of the incident plane-polarized beam, such that the electric field resulting from the application of voltage to collector bars 20 and 22 and interdigital electrodes 24 and 24' is applied at an angle of 45° with each of the planes of polarization of polarizer 14 and analyzer 26. This is indicated in FIG. 2, wherein arrows P and A illustrate the planes of polarization of polarizer 14 and analyzer 26, respectively, while arrow E indicates the direction of the electric field.

The light passing through analyzer 26 is detected by the eye 28 and is viewed as transmitted light. Alternatively, the transmitted light may be detected by a photomultiplier (not shown) and amplified by an amplifier (not shown).

The amount of light observed to pass analyzer 26 will depend upon the particular nature of the ferroelectric material from which wafer 16 is made, the electro-optic constant and thickness of the material, the voltage applied to element 16, and the optical transmission properties of polarizers 14 and 26. When a voltage is applied to ceramic element 16, it functions as a retarder, elliptically or circularly polarizing the incident plane polarized light, part of which passes through the second polarizer or analyzer 26. When no voltage is applied to ceramic element 16 (the "OFF" state), the amount of light transmitted is primarily the result of the extinction effect of crossed polarizers 14 and 26 and corresponds to high optical density, depending upon the particular polarizer materials employed and, generally, from about four to five optical density units.

When an electro-optic device comprising elements 14, 16 and 26 is utilized in a flashblindness protection device, control circuit 30 will be utilized to control the amount of voltage applied across ceramic element 16. A suitable control circuit may comprise a photodetector element to detect amounts of light in excess of preset limits and a discharge resistance to discharge the voltage across ceramic element 16, thus, returning element 16 to its isotropic and "OFF"-state protective mode.

Figure 3:
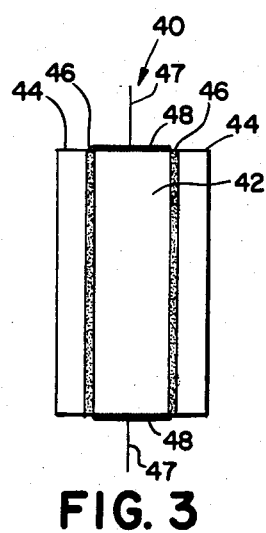
FIG. 3 is an elevational view of an embodiment of the invention illustrating an integral electro-optic device comprising a rigid laminate of a ferroelectric ceramic element bonded with a rigid adhesive in sandwich-like configuration to isotropic glass elements.

In FIG. 3 is shown an electro-optic device 40 of the invention wherein there is shown electro-optic ceramic element 42 bonded to rigid elements 44 with adhesive material 46. Field-induced ferroelectric material 42 constitutes the active material of electro-optic device 40 and is a ceramic material of the quaternary $(Pb_{1-x}La_x)(Zn_yTi_z)_{1-x/4}O_3$ system, commonly known as PLZT.

In general, the PLZT ceramic materials comprise a solid-solution system of closely-packed crystals in the ferroelectric tetragonal, paraelectric cubic and mixed phases and exhibit varied electro-optic effects. The PLZT materials have been characterized, within compositional regions, according to basic types of electro-optic behavior. Thus, in U.S. Pat. No. 3,666,666 (to G. H. Haertling), PLZT compositional regions are characterized on the basis of (1) memory, (2) quadratic (Kerr) and (3) linear (Pockels) electro-optic effects.

The PLZT ceramic materials useful in accordance with the present invention are those which in the quiescent or unpolarized condition are substantially isotropic and which, upon application of an electric field, exhibit quadratic (Kerr) effects. Such materials, in a field-induced state, exhibit birefringent properties. Upon discharge of the field, they relax to an optically isotropic (non-birefringent) state. These materials exhibit slim-loop hysteresis effects and, thus, have a coercive field of about zero.

PLZT materials useful as element 42 include those corresponding to the formula $(Pb_{1-x}La_x)(Zn_yTi_z)_{1-x/4}O_3$, wherein the ratio of y/z is from about 5/95 to about 90/10 and where x is in the range of about 9 and about 25 atom percent. This compositional series is described in U.S. Pat. No. 3,666,666, hereinbefore referred to and incorporated herein by reference. Especially preferred materials are the PLZT materials having the formula $(Pb_{1-x}La_x)(Zn_yTi_z)_{1-x/4}O_3$, wherein the ratio of y/z is about 65/35 and x is between about 9 and 12, for example, PLZT where the La/Zr/Ti ratio is 9.4/65/35.

Element 42 of the electro-optic device 40 can be typically a hot-pressed PLZT ceramic corresponding to the compositional ranges described hereinbefore and prepared in known manner. Generally, the PLZT ceramic materials can be prepared by hot-pressing at temperatures from about 800° C. to about 1300° C. for about 1 to 64 hours at a pressure of about 500 to 20,000 psi. Suitable methods for the preparation of hot-pressed PLZT materials can be found in the aforesaid U.S. Pat. Nos. 3,666,666 and in 3,744,875 (issued July 10, 1973 to G. H. Haertling et al). Examples of other suitable PLZT materials and methods for their preparation can be found in U.S. Pat. No. 3,997,690 (issued Dec. 14, 1976 to Chen).

Element 42 of electro-optic device 40 will generally be in the form of a wafer or plate having the major surfaces thereon substantially parallel and polished to an optical quality finish (e.g., polished to approach optical smoothness and flatness). The plates can be annealed, generally at from about 500° to 700° C., cooled to room temperature, and appropriate electrodes positioned or plated thereon.

Figure 5:
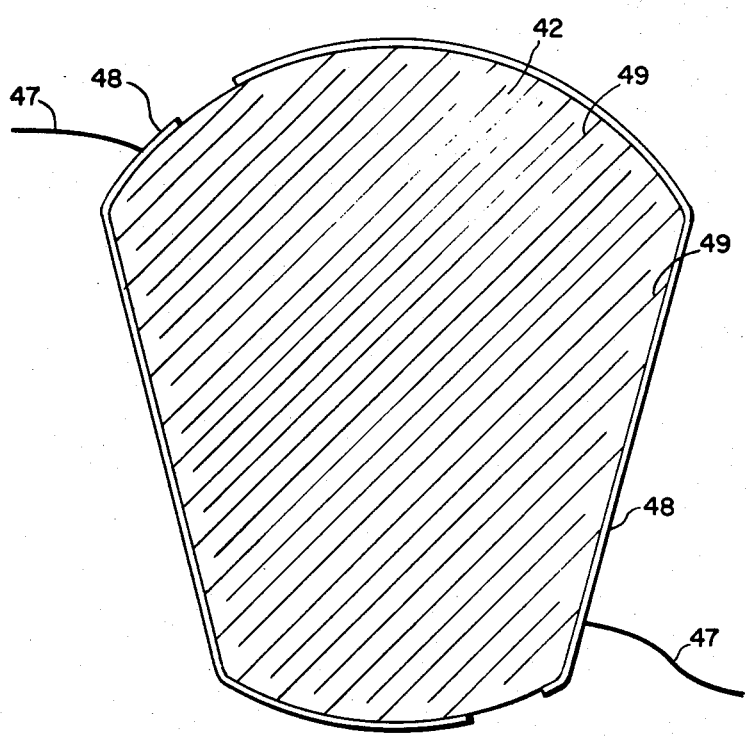
FIG. 5 is a plan view of a preferred electro-optic ceramic element of a device of the invention showing an arrangement of interdigital electrodes.

The birefringent effects induced by the application of a field across element 42 are achieved by application of the electric field in a transverse mode, i.e., transverse to the direction of light. Thus, leads 47 to edge electrodes or collector bars 48 are disposed transversely of the direction of propagation as is appropriate to a Kerr cell. A single transverse gap may be established by utilization of either surface or edge electrodes. In a preferred mode, a plurality of electrodes of conductive material is employed to establish the transverse field. Thus, electro-optic element 42 will preferably have a plurality of interdigital electrodes extending from collector bars 48 across substantially the entire area of each face of element 42. In FIG. 5 is shown a preferred arrangement whereby electro-optic element 42 of device 40 is in the form of a semi-round wafer having interdigital electrodes 49 extending from oppositely disposed collector bars or edge electrodes 48 to which leads 47 are attached.

Electro-optic device 40 comprises, in addition to the active PLZT ceramic element, rigid isotropic elements 44. Elements 44 can comprise the same or different rigid isotropic materials, such as glass, plastic, or the like. Inasmuch as electro-optic device 40 is intended for use as a light-shutter device, it was be appreciated that elements 44 will be composed of transparent material, preferably glass. PLZT materials, while substantially opaque in the ultraviolet region, transmit light into the infrared region. Where electro-optic device 40 is to be used in connection with flashblindness and thermal injury protection, it will be preferred to utilize, as elements 44, glass or like materials having infrared and near-infrared absorption capability. Suitable glass materials for this purpose include the conventional phosphate glass compositions, for example, those commercially available under the designation Schott KG-3 glass. A KG-3 glass of about 2 mm. thickness can be suitably employed for each of elements 44 and affords protection against infrared transmissions. In addition, such material provides rigidity to the electro-optic device, permitting manufacture of an integral device of compactness and structural integrity.

Elements 44 should be composed of a material, such as glass, which is isotropic. Thus, the material should be non-birefringent such that, upon relaxation of PLZT material 42 to its isotropic state, electro-optic device 40 can be utilized in conjunction with crossed polarizers without leakage of light through elements 44. As has been indicated, conventional glass compositions exhibit the required isotropy and can be utilized for each of elements 44.

Rigid sheet elements 44 are bonded in a sandwich-like configuration to ceramic material 42 by means of a layer of rigid adhesive 46. The nature of the adhesive material constitutes an important aspect of the present invention and will materially affect the optical response speed of the ceramic element 42. It has been found that the optical response speed of a free standing ferroelectric ceramic material can be substantially maintained or improved in a laminated electro-optic device by resort to adhesive materials exhibiting certain particular properties. Suitable adhesive materials are those effective to provide a rigid boundary between the interfaces of the ceramic element 42 and the isotropic elements 44 bonded thereto. The adhesive material must be curable to a rigid condition so as to permit assemblage of the elements of the electro-optic device and setting to a unitary composite having structural integrity.

The rigid mechanical coupling of sheet elements 44 to PLZT wafer 42, which is provided by rigid boundary adhesive material 46, has been found to greatly effect the switching characteristics of electro-optic device 40. Application of an electric field across the PLZT element is accompanied by mechanical strains as evidenced by an expansion of the ceramic element along the direction of the applied field. When the device is placed between crossed polarizers and the applied field in discharged, the amount of light transmitted through the second polarizer, or analyzer, is observed to decrease with time until the ultimate "OFF"-state optical density of the electro-optic system is realized. The optical response speed of an electro-optic device, such as device 40, can be considered for purposes of the present invention to be the time required, upon discharge of the applied field, to reach an optical density of 3. Typically, a free-standing PLZT wafer material, i.e., a wafer of PLZT material unbonded to additional elements, may be observed to exhibit an optical response speed in the order of about 50 to 150 microseconds or less. Depending, however, upon the nature of the boundary adhesive employed in the coupling of a PLZT material to a glass or polarizer element, considerable deterioration of the optical response speed of the free-standing ceramic may be observed.

It has been suggested that the continued transmission of light upon discharge of the applied field and the observed oscillations in the level of transmitted light are the result of piezoelectric coupling to radial mode oscillations in the PLZT ceramic. These oscillations have been attributed to strain relaxations occuring as the result of rapid discharge of the PLZT ceramic. While applicant does not wish to be bound by any particular theory as to the phenomena or mechanisms associated with deterioration of optical speed in an integrally bonded electro-optic device, or the operative means by which such speed is controlled or restored, it is believed that such control or restoration is achieved in part by the capacity of the rigid adhesive to modulate the mechanical oscillations of the rapidly discharged ceramic element.

Rigid boundary material 46, like sheet element 44, must be substantially optically isotropic, i.e., non-birefringent. The non-birefringent character of the boundary adhesive should be maintainable over a period of repeated switching operations. It will be appreciated that an electro-optic device utilized with crossed polarizers in a flashblindness protection device will be required to be in an isotropic state in the "OFF" protective mode. If the adhesive boundary material exhibits birefringence, it will be appreciated that leakage of light through the analyzer will result. In the case of flashblindness protection device, this will be a particularly disadvantageous occurrence and is to be avoided.

The formation of adhesive material 46 into a rigid and thin boundary layer between electro-optic element 42 and sheet elements 44 constitutes an important aspect of the present invention. In general, the application of a thin and flexible coating to a PLZT wafer will not importantly affect the optical response speed of the free-standing PLZT element. Where a rigid electro-optic device is desired and rigid glass, polarizer or other elements are bonded to the PLZT element, the nature of the boundary adhesive utilized in the bonding of the elements thereof will materially effect the optical response speed of the device. Where, for example, rigid elements 44 are bonded to a PLZT element, as shown in FIG. 3, the nature of the coupling boundary will affect speed of the device. Utilization of a soft boundary will provide adequate optical response speed only where a relatively thick layer of adhesive material is employed. The utilization of a thick layer of adhesive is, however, undesired from a manufacturing standpoint inasmuch as monitoring and controlling functions are required to assure proper control of desired boundary thickness and adequate optical response speed. The utilization of too-thin a layer of soft adhesive, as may be obtained by simply applying the adhesive to the surfaces to be bonded, pressing the elements and removing excess adhesive, tends to result in poor optical response speed of the electro-optic device. A rigid adhesive, however, can be applied in a thin layer by simply applying the adhesive material to the elements to be bound, pressing the elements together and removing excess adhesive material. Such a thin layer, in the order of about 0.02 to 0.13 mm., can be effectively utilized in the bonding of rigid elements, such as elements 44, to the PLZT element 42 while achieving rapid optical response speeds in laminated or bonded electro-optic devices and convenient assemblage of the elements thereof.

Adhesive materials which can be effectively utilized herein include cross-linked polyester adhesives. These adhesives are exemplified by the cross-linked polyesters of an unsaturated dibasic acid and a polyglycol. Unsaturated polyesters which can be rendered insoluble and infusible by cross-linking are commercially important types of polymeric materials and include the unsaturated polyesters made by conventional esterification of a glycol with an unsaturated acid such as maleic acid. The double bonds in the polyester can be used as sites for copolymerization with vinylic monomers, of which styrene is typical and most widely used.

Examples of suitable unsaturated polyester materials which can be cross-linked to adhesive boundary materials for the devices of the present invention include those having the formula

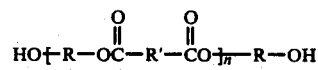

wherein R is a bivalent radical such as alkylene of from 2 to 6 carbon atoms having zero to two oxygen atoms (e.g., ethylene, propylene,

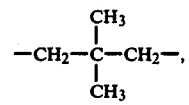

—CH$_2$—CH$_2$—O—CH$_2$—CH$_2$—, —CH$_2$—CH$_2$—O—CH$_2$—CH$_2$—O—CH$_2$—CH$_2$—); arylene (e.g., phenylene); cyclo-aliphatic radicals (e.g., —CH$_2$—C$_6$H$_{10}$—CH$_2$—); bivalent radicals of the formula

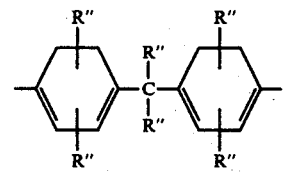

where R" is hydrogen or alkyl); and wherein R' is alkenylene (e.g., vinylene). It will be appreciated from inspection of the above formula that the group, R', may be derived from an unsaturated dibasic acid. Exemplary unsaturated dibasic acids (and their anhydrides) which provide the residue R' include maleic acid, fumaric acid and anhydrides thereof. It can also be seen that each R group is the residue group from a dihydric material such as ethylene glycol, propylene glycol, neopentyl glycol, cyclohexane dimethanol, bisphenol A or the like.

Suitable vinylic monomers which function as cross-linking agents in the setting of the unsaturated polyester material to an insoluble and infusible polymer include styrene, diallyl phthalate, and the like. The mixture comprising the unsaturated polyester, the vinyl monomer and the initiator system capable of generating free radicals is applied to the elements to be bonded and allowed to cure. The combinations of methyl ethyl ketone peroxide and cobalt naphthenate, and benzoyl peroxide and diethyl aniline are examples of initiator systems containing a peroxide and an activator compound to promote the chemical decomposition of the peroxide at ambient temperature. Methyl ethyl ketone peroxide, cyclohexanone peroxide and benzoyl peroxide are the most common ambient temperature cross-linking initiator systems containing an activator compound, while cumene hydroperoxide, t-butyl perbenzoate, t-butyl peroctoate and benzoyl peroxide are initiators used at elevated temperatures. The unsaturated polyester resin utilized in the manufacture of suitable adhesive materials is a low-molecular-weight condensation polymer usually ranging in molecular weight from about 1500 to about 3500. When cross-linked with a vinylic monomer, and depending upon the particular monomer employed, a polymeric material of complex structure is produced. The cross-linked polymeric material is, however, useful to provide effective bonding of the elements of an electro-optic device consistent with rapid optical response speed of the ferroelectric ceramic element thereof.

Especially useful herein is a polyester of maleic acid and ethylene glycol cross-linked to an insoluble and infusible rigid adhesive with styrene monomer. Such material provides a compact and rigidly bonded structure exhibiting good optical response speeds.

Electro-optic device 40 can be utilized in a number of applications including light switches, display devices and the like. It will be appreciated that electro-optic device 40 will effect modulation of the intensity of input light by modulation of the polarization thereof. Accordingly, the subcombination comprising electro-optic device 40 is useful in and of itself for modulation of the polarization characteristics of light and constitutes a preferred device of the invention. In conjunction with crossed polarizers, electro-optic device 40 can be used as a fast-shutter device. In some applications, it may be desired to utilize an electro-optic device integrally bonded to crossed polarizers. Such a device is especially suited to use in fast-shutter devices such as are contemplated for protection of flashblindness. Such a device is shown as article 50 in FIG. 4.

Figure 4:
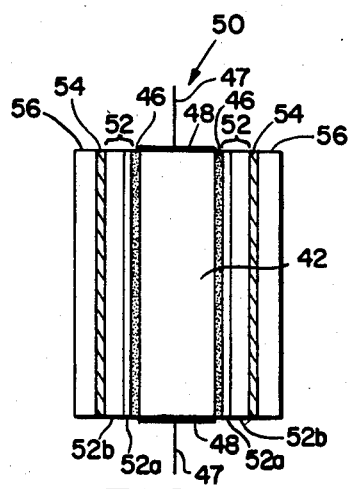
FIG. 4 is an elevational view of a preferred electro-optic device of the invention showing a PLZT ceramic material rigidly bonded to crossed polarizer and glass elements.

In FIG. 4 is shown an electro-optic device 50 wherein polarizer elements 52 are adhesively bonded to PLZT ceramic element 42 by means of rigid adhesive 46 and wherein glass sheet elements 56 are bonded with adhesive 54 to polarizer elements 52. PLZT materials useful as element 42 in electro-optic device 50 include those described hereinbefore in connection with element 42 of electro-optic device 40. Similarly, adhesive materials 46 described in connection with electro-optic device 40 of FIG. 2 can be utilized in electro-optic device 50 for the bonding of polarizer elements 52 to PLZT element 42.

Polarizer elements 52, which may be of the same or different polarizing material, may be comprised of any of a variety of materials which produce the desired light-polarization effects. Preferred polarizing materials include the polymeric light-polarizing sheet materials. Such materials are known and typically will comprise a base or substrate material 52b, such as cellulose acetate butyrate or the like onto which is laminated a layer of polarizing material 52a comprising iodine-stained substantially oriented molecules of polyvinyl alcohol. Suitable polarizing materials can be found in U.S. Pat. Nos. 2,173,304; 2,255,940; 2,306,108; 2,397,231; 2,445,555; 2,453,186 and 2,674,159. Suitable sheet polarizer elements 52 are commercially available as materials HN-22 and HN-38S (Polaroid Corporation, Cambridge, Massachusetts). As is shown in connection with FIG. 1, the polarizer elements of an electro-optic device will be in a crossed relationship. Thus, in electro-optic device 50, polarizer elements 52, one of which will be an analyzer component, will be oriented with their polarization axes in perpendicular planes.

Bonded to polarizer elements 52 are shown elements 56 which may be the same or different sheet elements, typically glass or plastic. Such elements are optional but preferred from the standpoint of providing article 50 with desired ruggedness and protection for the surfaces of polarizer elements 52. Suitable adhesives include those useful to provide adhesive boundary layer 46, although other adhesives such as rigid epoxy resins can be suitably employed. Sheet elements 56 can be coated with anti-reflection layers or corrected to the vision of the wearer of a device embodying article 50. Similarly, sheet elements 56 may contain IR- or UV-absorbing materials where desired.

Electro-optic device 50 can be employed as a compact and rigidly bound lens element in devices such as welders glasses, pilots goggles, helmets and the like. An electric field can be applied to the PLZT element across collector bars 48. By means of a suitable control circuit as shown in FIG. 1, electro-optic device 50 can be utilized to transmit light to the eyes of the wearer of protective goggles, helmet or the like and be caused to become non-transmissive in response to a flashing of light in excess of preset threshold limits.

The following Examples illustrate certain preferred embodiments of the invention and are not intended as limiting the invention.

EXAMPLE I

Figure 6:
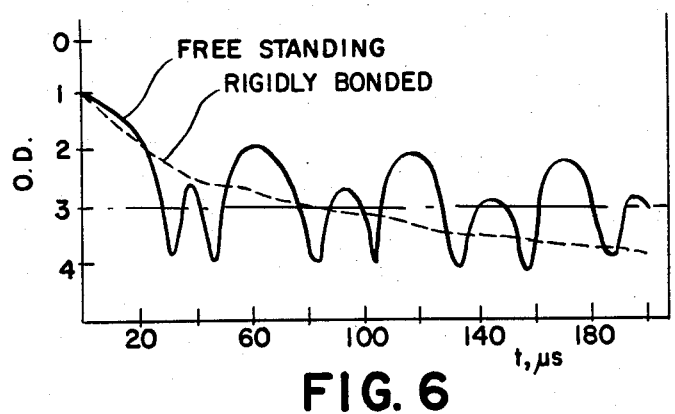
FIG. 6 is a graph illustrating the switching characteristics of a preferred electro-optic device of the invention.

An electro-optic phase retardation device of the type illustrated in FIG. 3 was constructed in the following manner. A PLZT ceramic wafer having a shape as shown in FIG. 5, a thickness of 0.38 mm. and a diameter across the arcuate portions thereof of 101.6 mm. (4 inches) was bonded in a sandwich-like configuration between a pair of identically shaped soda-lime glass elements of thickness 1.6 mm. and 0.7 mm. The PLZT element was a hot-pressed element having a La/Zr/Ti ratio of 9.4/65/35 and contained edge collector bars and interdigital electrodes as illustrated in FIG. 5, the interdigital electrodes extending across both surfaces of the PLZT element and being approximately 1.25 mm. apart and formed by electroless metal filling of score lines across each face of the element. The glass elements were bonded to the PLZT ceramic element with an adhesive (M-62 Lens Bond Optical Cement, Summers Laboratories, Inc., Fort Washington, Pa.) comprising a cross-linked polyester of ethylene glycol and maleic acid, the cross-linking polymerization being initiated by addition of peroxide catalyst to a mixture of styrene and the polyester. Adhesive was applied to the boundary of ceramic and glass elements, the elements of the resulting sandwich were compressed, excess adhesive material was removed and the adhesive was allowed to fully cure (in excess of 100 hours) to a rigid boundary of approximately 0.08 mm. thickness. The resulting integral electro-optic device was evaluated as a fast-shutter device by placing the device in a path of light from a helium-neon laser (632 nanometers) and between a pair of polarizers (HN-38, Polaroid Corporation). A voltage (780 volts D.C.) was applied across the terminals of the device and the rate of rise in optical density was measured in known manner on an oscilloscope which was triggered by switching off the applied voltage through a discharge resistor. The device exhibited optical response speed characteristics superior to the free-standing PLZT ceramic element as is shown in FIG. 6.

EXAMPLE II

Figure 7:
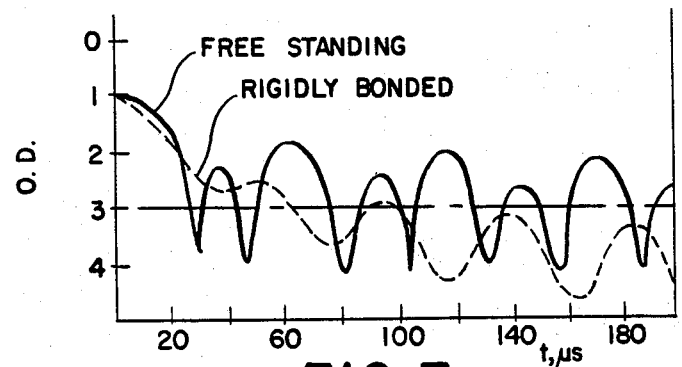
FIG. 7 is a graph illustrating the switching characteristics of another preferred electro-optice device of the invention.

An integral and rigidly bound electro-optic device of type illustrated in FIG. 4 was constructed in the following manner. A PLZT ceramic element, as described in Example I, was bonded in sandwich-like fashion between a pair of identically shaped polymeric sheet polarizer elements (HN-38S, Polaroid Corporation). The polarizer elements were comprised of a layer of iodine-stained oriented polyvinyl alcohol (0.02 mm) on a cellulose acetate butyrate support sheet (0.13 mm.) and the polarizer elements were bonded with their polarizing layer on the PLZT element utilizing a rigid boundary of about 0.08 mm. of the cross-linked polyester adhesive described in Example I. The polarizer elements were bonded with their polarization axes in perpendicular planes, each such axis being disposed at an angle of 45° with respect to the optical axis of the electro-optic ceramic element in accordance with the relationship shown in FIG. 2. A sheet (2 mm. thick) of glass having infrared absorption capability (Schott Optical Glass, Inc., Duryea, Pa.) was bonded to the support sheet of each of the polarizer elements utilizing an adhesive comprised of a 70/30 by weight ratio of epoxy thermosetting resin (Epotuf 37-128, Reichold Chemical, Inc., White Plains, New York) and polyamide hardener (Versamid 140, General Mills Chemicals, Inc., Minneapolis, Minnesota) admixed with an aliphatic glycidyl ether diluent (Epoxide 8, The Procter & Gamble Company, Cincinnati, Ohio, at a 10% by weight epoxide level. The fully cemented electro-optic device exhibited an optical response speed superior to that of the free-standing ceramic element, as shown in FIG. 7.

EXAMPLE III

Figure 8:
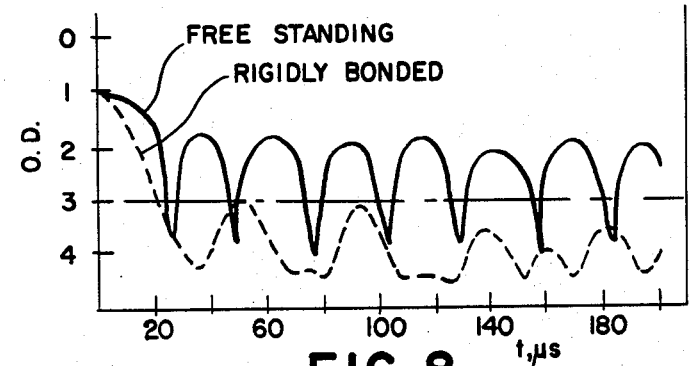
FIG. 8 is a graph illustrating the switching characteristics of still another preferred electro-optic device of the invention.

An integral and rigidly bound electro-optic device of type illustrated in FIG. 4 was constructed in the following manner. A PLZT ceramic element, as described in Example I except having a resin coating on each side to reduce space-charge effects (copolymer of vinyl chloride and vinyl acetate, Bakelite, VYHH, Union Carbide Corporation, New York, New York), was bonded in sandwich-like fashion between a pair of identically shaped polymeric sheet polarizer elements. The polarizer elements were comprised of a layer of iodine-stained oriented polyvinyl alcohol (0.02 mm.) on a non-oriented polyvinyl alcohol support sheet (0.25 mm.) and the polarizer elements were bonded with their polarizing layer on the PLZT element utilizing a rigid boundary of about 0.08 mm. of the cross-linked polyester adhesive described in Example I. The polarizer elements were bonded with their polarization axes in perpendicular, each such axis being disposed at an angle of 45° with respect to the optical axis of the electro-optic ceramic element in accordance with the relationship shown in FIG. 2. A sheet (2 mm. thick) of glass having infrared absorption capability (Schott Optical Glass, Inc., Duryea, Pa.) was bonded to the support sheet of each of the polarizer elements utilizing an adhesive comprised of a 70/30 by weight ratio of epoxy thermosetting resin (Epotuf 37-128, Reichold Chemicals, Inc., White Plains, New York) and polyamide hardener (Versamid 140 hardener, General Mills Chemicals, INc., Minneapolis, Minnesota) admixed with an aliphatic glycidyl ether diluent (Epoxide 8, The Procter & Gamble Company, Cincinnati, Ohio) at a 10% by weight epoxide level. The fully cemented electro-optic device exhibited an optical response speed superior to that of the free-standing ceramic element, as shown in FIG. 8.

A preferred electro-optic device of the invention has been illustrated as incorporating polarizer and analyzer components oriented with their planes of polarization perpendicular to one another. In such an embodiment of the invention, in the absence of an electric field, no light is passed by the device. In other embodiments of the invention, the polarizer and analyzer elements may have their planes of polarization in other relationships. For example, if the planes of polarization are parallel to one another or disposed at an angle other than 90°, light will be transmitted by the device in the absence of an electric field, while the presence of the field will decrease or eliminate the passage of light. Regardless of the relative orientations of the planes of polarization, some modulation of the intensity of input light will be effected through modulation of the polarization characteristics of the light. Accordingly, electro-optic devices wherein polarizer and analyzer elements are disposed such that their planes of polarization are in other than a mutually perpendicular relationship are contemplated herein.

What is claimed is:

1. An electro-optic phase retardation device comprising an optically transparent lanthanum-modified lead zirconate titanate electro-optic ceramic element exhibiting substantially isotropic properties in a quiescent state and quadratic electro-optic properties in a field-induced state, said electro-optic ceramic element having substantially parallel optical quality surfaces, electrode means for applying an electric field to said electro-optic ceramic element in a plane normal to the direction of propagation of light through the electro-optic device; and isotropic sheet elements bonded to said electro-optic ceramic element in sandwich-like configuration with an adhesive effective to provide a rigid boundary between the interfaces of said ceramic electro-optic element and isotropic sheet elements.

2. The electro-optic phase retardation device of claim 1 wherein the isotropic sheet elements adhesively bonded to said electro-optic ceramic element comprise sheets of glass.

3. The electro-optic phase retardation device of claim 2 wherein the electro-optic ceramic element is a lanthanum-modified lead zirconate-titanate exhibiting slim-loop hysteresis properties and has a coercive field of about zero.

4. The electro-optic phase retardation device of claim 3 wherein the electro-optic ceramic element is a lanthanum-modified lead zirconate-titanate having the formula $(Pb_{1-x}La_x)(Zn_yTi_z)_{1-x/4}O_3$, wherein the ratio of y/z is in the range of from about 5/95 to about 90/10 and wherein x is in the range of from about 9 to about 25 atom percent.

5. The electro-optic phase retardation device of claim 4 wherein the ratio of y/z is about 65/35 and x is in the range of about 9 to about 12.

6. The electro-optic phase retardation device of claim 1 wherein said means for applying an electric field to said ceramic element comprises metallic electrodes on at least one of said optical quality surfaces.

7. The electro-optic phase retardation device of claim 6 wherein said means for applying an electric field to said ceramic element comprises a plurality of interdigital electrodes extending across substantially the entire area of each of said optical quality surfaces.

8. The electro-optic phase retardation device of claim 7 wherein the electro-optic ceramic element is a lanthanum-modified lead zirconate-titanate exhibiting slim-loop hysteresis properties and has a coercive field of about zero.

9. The electro-optic phase retardation device of claim 8 wherein the ceramic element is a lanthanum-modified lead zirconate-titanate having the formula $(Pb_{1-x}La_x)(Zn_yTi_z)_{1-x/4}O_3$ wherein the ratio of y/z is in the range of from about 5/95 to about 90/10 and wherein x is in the range of from about 9 to about 25 atom percent.

10. The electro-optic retardation device of claim 9 wherein the glass elements are bonded to said electro-optic ceramic element with an adhesive comprising a cross-linked polyester of an unsaturated dibasic acid and a dihydric alcohol.

11. The electro-optic phase retardation device of claim 9 wherein the adhesive comprises a styrene cross-linked polyester of maleic acid and ethylene glycol.

12. The electro-optic phase retardation device of claim 1 wherein the adhesive comprises a layer of about 0.02 mm. to about 0.13 mm. thickness.

13. An electro-optic phase retardation device comprising an optically transparent lanthanum-modified lead zirconate-titanate electro-optic ceramic element exhibiting substantially isotropic properties in a quiescent state and quadratic electro-optic properties in a field-induced state, said electro-optic ceramic element having substantially parallel optical quality surfaces, electrode means for applying an electric field to said electro-optic ceramic element in a plane normal to the direction of propagation of light through the electro-optic device, and polarizer elements bonded to said electro-optic ceramic element in sandwich-like configuration with an adhesive effective to provide a rigid boundary between the interfaces of said electro-optic ceramic element and said polarizer elements.

14. The electro-optic phase retardation device of claim 13 wherein the polarizer elements are comprised of polymeric light-polarizing sheet materials.

15. The electro-optic phase retardation device of claim 14 wherein the light-polarizing sheet elements are oriented with their polarization axes in perpendicular planes.

16. The electro-optic phase retardation device of claim 15 wherein the electro-optic ceramic element is a lanthanum-modified lead zirconate-titanate exhibiting slim-loop hysteresis properties and has a coercive field of about zero.

17. The electro-optic phase retardation device of claim 16 wherein the electro-optic ceramic element is a lanthanum-modified lead-zirconate-titanate having the formula $(Pb_{1-x}La_x)(Zr_yTi_z)_{1-x/4}O_3$ wherein the ratio of y/z is in the range of from about 5/95 to about 90/10 and wherein x is in the range of from about 9 to about 25 atom percent.

18. The electro-optic phase retardation device of claim 17 wherein the ratio of y/z is about 65/35 and x is in the range of about 9 to about 12.

19. The electro-optic phase retardation device of claim 13 wherein the polarizer elements are bonded to said electro-optic ceramic element with an adhesive comprising a cross-linked polyester of an unsaturated dibasic acid and a dihydric alcohol.

20. The electro-optic retardation device of claim 19 wherein the adhesive comprises a styrene cross-linked polyester of maleic acid and ethylene glycol.

21. The electro-optic phase retardation device of claim 13 wherein a transparent glass sheet element is bonded to each of said polarizer elements.

22. The electro-optic phase retardation device of claim 13 wherein said means for applying an electric field to said ceramic element comprises metallic electrodes on at least one of said optical quality surfaces.

23. The electro-optic phase retardation device of claim 22 wherein said means for applying an electric field to said ceramic element comprises a plurality of interdigital electrodes extending across substantially the entire area of each of said optical quality surfaces.

24. The electro-optic phase retardation device of claim 23 wherein the electro-optic ceramic element is a lanthanum-modified lead zirconate-titanate exhibiting slim-loop hysteresis properties and has a coercive field of about zero.

25. The electro-optic phase retardation device of claim 24 wherein the electro-optic ceramic element is a lanthanum-modified lead zirconate-titanate having the formula $(Pb_{1-x}La_x)(Zr_yTi_z)_{1-x/4}O_3$ wherein the ratio of y/z is in the range of from about 5/95 to about 90/10 and wherein x is in the range of from about 9 to about 25 atom percent.

26. The electro-optic phase retardation device of claim 25 wherein said polarizer elements are bonded to said electro-optic ceramic element with an adhesive comprising a cross-linked polyester of an unsaturated dibasic acid and a dihydric alcohol.

27. The electro-optic phase retardation device of claim 26 wherein the adhesive comprises a styrene cross-linked polyester of maleic acid and ethylene glycol.

28. The electro-optic phase retardation device of claim 27 wherein a transparent glass sheet element is bonded to each of said polarizer elements.

29. The electro-optic phase retardation device of claim 13 wherein the adhesive comprises a layer of from about 0.02 mm. to about 0.13 mm. thickness.

* * * * *